United States Patent [19]

Benz

[11] 4,336,420
[45] Jun. 22, 1982

[54] SUPERCONDUCTING CABLE

[75] Inventor: Hans Benz, Zurich, Switzerland

[73] Assignee: BBC, Brown, Boveri & Company, Limited, Baden, Switzerland

[21] Appl. No.: 141,253

[22] Filed: Apr. 17, 1980

[30] Foreign Application Priority Data

Jun. 5, 1979 [CH] Switzerland .................. 5183/79

[51] Int. Cl.³ ............................................. H01B 5/08
[52] U.S. Cl. .................................. 174/128 S; 29/599; 174/15 S; 174/15 C; 174/126 S; 335/216
[58] Field of Search ............... 174/15 S, 15 C, 126 S, 174/128 S, 130, 13; 57/211, 214, 218; 29/599; 336/DIG. 1; 335/216

[56] References Cited

U.S. PATENT DOCUMENTS

| | | | |
|---|---|---|---|
| 3,277,564 | 10/1966 | Webber et al. | 29/599 X |
| 3,366,728 | 1/1968 | Garwin et al. | 174/126 S X |
| 3,428,926 | 2/1969 | Bogner et al. | 174/128 S |
| 3,443,021 | 5/1969 | Schrader | 335/216 |
| 3,453,378 | 7/1969 | McInturff | 29/599 X |
| 3,596,349 | 8/1971 | Boom et al. | 335/216 X |
| 3,604,833 | 9/1971 | Beck | 174/15 S |
| 3,638,154 | 1/1972 | Sampson et al. | 174/126 S X |
| 3,657,466 | 4/1972 | Woolcock et al. | 174/128 S X |
| 3,764,725 | 10/1973 | Kafka | 174/15 S |
| 3,876,823 | 4/1975 | Penczynksi | 174/15 S X |
| 3,956,724 | 5/1976 | Fagan, Jr. | 335/216 |
| 4,079,187 | 3/1978 | Fillunger et al. | 174/126 S X |
| 4,169,964 | 10/1979 | Horvath et al. | 174/15 S |

FOREIGN PATENT DOCUMENTS 52-25592  2/1977  Japan .................................... 29/599

Primary Examiner—Volodymyr Y. Mayewsky
Attorney, Agent, or Firm—Oblon, Fisher, Spivak, McClelland & Maier

[57] ABSTRACT

A superconducting cable containing a plurality of individual wires which are stranded or plaited to wire bundles and ropes, wherein in order to avoid relative movement and/or deformation between the wire bundles and/or ropes as, for example, may otherwise be caused by high current loading, the individual wire bundles and the ropes are materially joined together at their points of contact, preferably by soldering, to form a mechanically rigid structure, in which the parts between the soldered areas can as well as possible deform elastically, thereby avoiding all disadvantages associated with freely movable wire bundles. In a preferred embodiment, the ropes are made from wire bundles arranged in a lattice.

17 Claims, 13 Drawing Figures

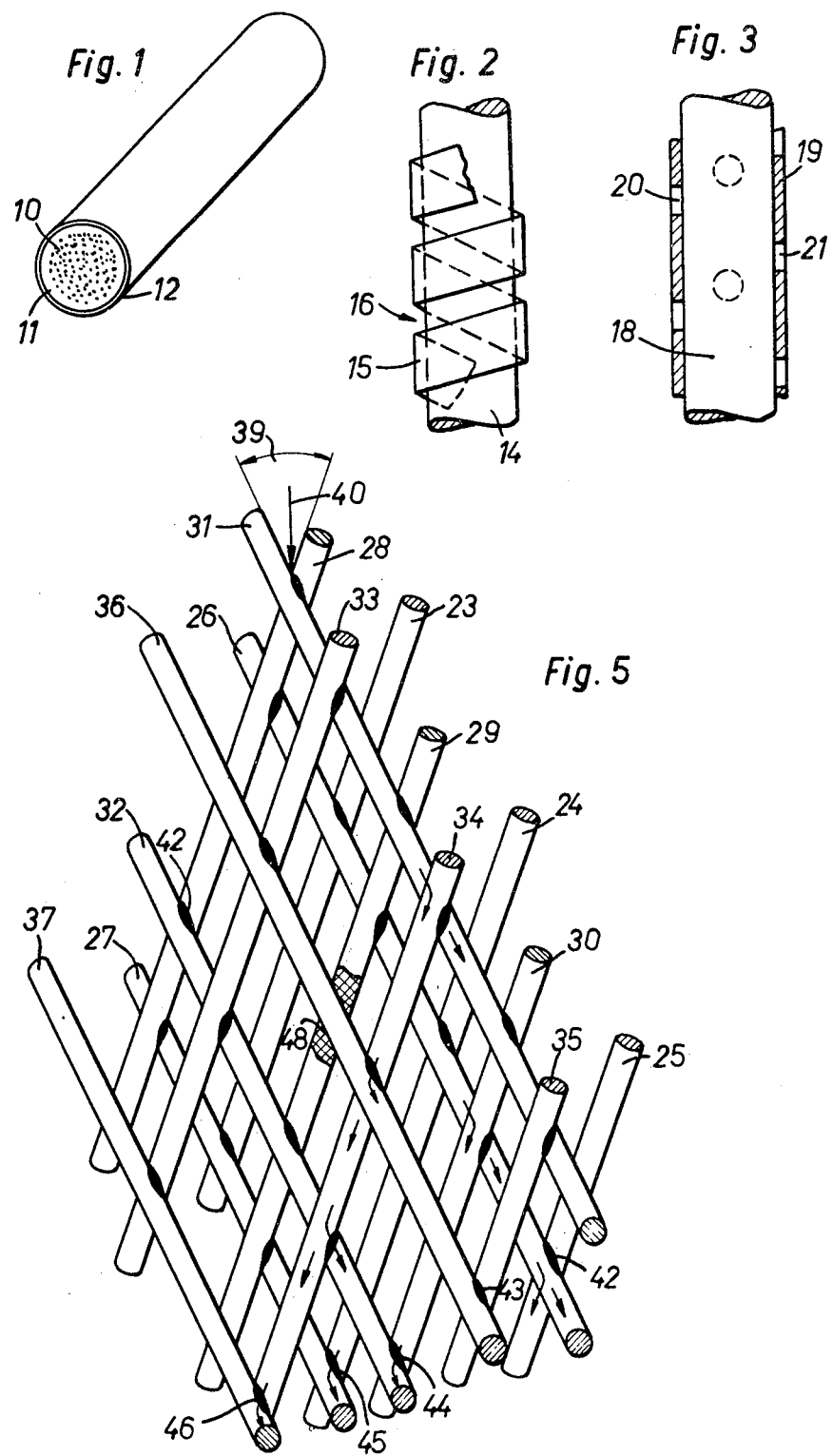

SUPERCONDUCTING CABLE

BACKGROUND OF THE INVENTION

1. Field of the Invention

This invention relates to a superconducting cable consisting of a plurality of wires, each of which has several filaments of a superconducting material embedded in a matrix material, wherein the wires are stranded or plaited and solered to wire bundles which are then stranded or plaited to rope which is in turn stranded or plaited to cable.

2. Description of the Prior Art

Superconducting cables are particularly used for the winding of coils which are intended for the excitation of very strong electromagnetic fields. According to the state of the art, the cable contains many ropes made from wire bundles. Two processes are used to cool the cable down to the temperature necessary for the superconduction: bath cooling in which the whole coil is immersed in a bath of a cooling medium; and forced cooling in which a cooling medium is pressed through the spaces between the wire bundles and the ropes (matrix cooling) and/or through cooling channels built into the cable (tubular conductor cooling). Cables intended to be matrix cooled are necessarily enclosed in a gastight case, while cables which are to be bath cooled preferably have no case.

On exciting magnetic coils, forces corresponding to the vectorial product of the exciting current and the magnetic induction act on the current conductors. These forces are directional and can cause a deformation of the conductors' cross section and the windings' cross section, as well as a change in the relative position of adjacent conductors. These deformations and changes of position can further cause a decrease in the contact pressure between neighboring conductors and/or a relative displacement of neighboring conductors. Both phenomena are particularly disadvantageous for superconducting cable.

During the relative displacement of adjacent conductors, heat can be generated from the resultant friction, which causes a small local rise in temperature and which is particularly disadvantageous at the operating temperature of superconducting cables.

The forces and the deformations caused thereby combine to produce a directional force on the inner wall of the casing, which can lead to an elastic deformation of the casing. For windings with tightly packed cable casings, the deformation forces of the cases are additive in the direction of the force, so that not only the associated Lorenz force, but in addition the mechanically transmitted deformation of the casing, acts on the individual cable.

SUMMARY OF THE INVENTION

Accordingly, one object of this invention is to provide a novel superconducting cable whose individual conductors are only elastically and not plastically deformed by the electromagnetic forces, wherein the individual conductors also cannot be displaced relative to one another.

According to the invention, the above-noted problem is solved, such that the bundle of wires in the rope and the adjacent ropes are materially connected together in the region of the point or line of contact.

With the materially connecting joint of the individual conductors in the new superconducting cable, it can be effectively prevented that the adjacent conductors change their relative positions, as well as the accompanying troublesome frictional heat produced thereby. Also, the thermal resistance is not changed upon exciting the coil, whereby optimal cooling and the rapid equalizing of thermal instabilities are assured. Finally, the materially connecting joint forms a self-supporting mechanical construction, which can absorb a large fraction of the forces created by the electromagnetic field.

In a first preferred embodiment, the materially connecting joint is made by soft soldering.

In a further preferred embodiment, the bundles of wires are arranged in several layers on top of each other to form a lattice, and within each layer are aligned parallel to each other, whereby the adjacent layers of a wire bundle together form an angle whose bisector lies along the longitudinal direction of the cable.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a perspective view of a superconducting wire;

FIG. 2 is a plan view of a superconducting wire, which is wound with a material of high electrical resistivity;

FIG. 3 is a plan view of a superconducting wire, which is encased in a material of high electrical resistivity;

FIG. 5 is a perspective view of a rope formed of plural wire bundles superimposed in parallel layers in the form of a spatial lattice;

DESCRIPTION OF THE PREFERRED EMBODIMENTS

Figure 4:
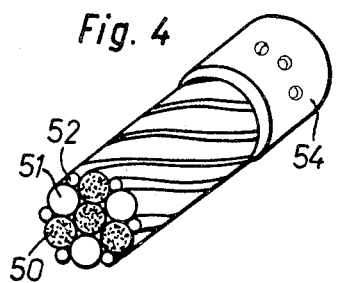
FIG. 4 is a perspective view of a wire bundle containing many superconducting wires and stabilizing wires stranded together.

Referring now to the drawings, wherein like reference numerals designate identical or corresponding parts throughout the several views, and more particularly to FIG. 1 thereof, there is shown a superconducting wire consisting of a plurality of superconducting filaments 10, which for thermal and electrical stability are loosely stranded and embedded in a matrix 11 of an electrically and thermally good conducting metal. The wire is coated with a thin layer 12 of soft solder, which makes possible the production of soldered joints to other, adjacent wires.

FIG. 2 shows a plan view of a superconducting wire 14, which is spirally wound with a strip 15 of a heat conducting material with high electrical resistivity. As already mentioned, this winding is intended to reduce as far as possible the unwanted eddy-currents between neighboring wires. The strip 15 is preferably soldered to the wire 14 along the total area of contact. For the example shown, the strip is wound such that neighboring side edges have a gap between them and a spiral shaped groove 16 is formed between the individual coils. This groove can be used as a channel for coolant for cables with matrix cooling.

It is also possible to wind the strip 15 such that its side edges lie close together or with overlapping edges, should this be simpler or more advantageous.

It is further possible, instead of the strip 15 shown, to wind a wire of heat conducting material of high electrical resistivity around the superconducting wire and then solder it, whereby the individual windings of the wire can be chosen to have a gap between them or lie close together, or even be wound with a variable gap.

A suitable heat conducting materal with high electrical resistivity is a conventional copper-nickel alloy.

For the specific embodiment corresponding to FIG. 3, the superconducting wire 18 is surrounded by a soldered-on casing 19 made of a thermally conducting material having a high electrical resistivity. The casing has openings 20, 21 which are distributed around the entire circumference and arranged at regular intervals and which are provided for the direct influx of the coolant to the superconducting wire.

FIG. 4 shows a wire bundle composed of many superconducting wires 50 which are stranded with normally conducting wires 51, 52 of different diameters, which act as stabilizers. These stabilizing wires are made, for example, out of copper or aluminum. All wires are coated with a thin surface layer of solder and in the regions of the lines of contact are soldered together.

The stranded wire bundle is surrounded by a perforated casing 54 made of a thermally conducting material having a high electrical resistivity, in order to avoid unwanted eddy-currents in neighboring wire bundles.

FIG. 5 shows a rope, made in the form of a spatial lattice. This rope is composed of many wire bundles 23 to 37. The wire bundles form grid layers, whereby the individual layers are made from wire bundles 23, 24, 25; or 26, 27; or 28, 29, 30; or 31, 32; or 33, 34, 35 or 36, 37 arranged parallel to one another. The wire bundles of the layers lying on top of one another occlude an angle 39 which lies parallel to the longitudinal direction of the cable, marked with an arrow, along which the current will flow. The wire bundles are soldered together in the region of all contact areas as is shown with the marked solder beads, for example 42, 43, 44, 45, 46.

The current through the rope is practically uniformly distributed among the individual wire bundles. If one of the wire bundles is broken or if a part of a wire bundle jumps from the superconducting to normally conducting condition, for example because of a thermal instability, then the neighboring wire bundles take over the current conduction. This is shown in FIG. 5 with the example of the wire bundle 29, which has a non-conducting or non-superconducting part 48. The current in the wire bundle 29 flows then in the wire bundles 31 and 26, where it is further passed on into at least the wire bundles 34 and 30 and 24 and 30, respectively. It should thereby be understood that no disruption of a wire bundle, practically all other wire bundles of the rope take over a part of the current conduction, which does not need to be described in detail here. It can also be clearly recognized from FIG. 5 that the solder beads between neighboring bundles of wire do not decrease the free space in the lattice structure and thereby do not restrict the flow of the coolant.

Figure 8:
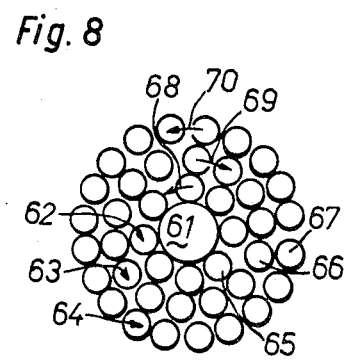
FIG. 8 is a cross-sectional view through a rope, which contains several like bundles stranded together to coaxial layers.

It is to be understood that instead of the rope shown in FIG. 5, which is made simply from wire bundles lying on top of one another, ropes of wire bundles plaited together are preferably used, which furthermore have a circular cross-section, as is shown in FIG. 8, which is yet to be described.

Figure 6:
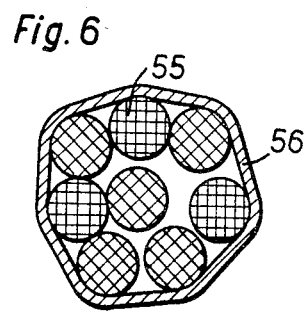
FIG. 6 is a cross-sectional view through a rope encased in a material of high electrical resistivity, where the rope contains several plaited wire bundles.

FIG. 6 shows schematically a cross-section through a cable rope which contains eight wire bundles, of which only the bundle 55 is identified with a code number. Each wire bundle is preferably made from superconducting and stabilizing wires stranded together, as shown for example in FIG. 4, or from plaited and transposed wires, whose position in the middle and outside, respectively, of the rope is periodically interchanged. This last arrangement makes possible a better suppression of unwanted induced currents. The rope has a winding or surrounding 56 of a thermally conducting material with high electrical resistivity. The individual wire bundles are soldered together and to the winding or casing at the points or lines of contact. It is to be understood that the casing has many openings, so that coolant can as far as possible flow unrestricted into the rope and past the wire bundles.

Figure 7:
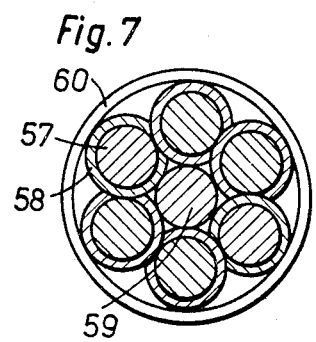
FIG. 7 is a cross-sectional view through a rope encased in a material of high electrical resistivity, where the rope contains many wire bundles, wound with a material of high electrical resistivity and then stranded together.

FIG. 7 shows schematically the cross-section through another rope embodiment which contains six wire bundles of which only the wire bundle 57 is identified with a code number. Each wire bundle contains many wires stranded together as shown in FIG. 4, and is wound with a strip 58 made of a thermally conducting material with a high electrical resistivity, as shown by the strip 15 in FIG. 2 for the wire 14. The winding is done such that the width of the groove between neighboring windings is greater than the width of the strip itself, and the windings of neighboring wire bundles can be "screwed into" each other as shown. The wire bundles are stranded around a central stabilizing wire 59 and encased in a surrounding casing 60. For this rope the points or lines of contact between the individual wire bundles and the wound around strip and the strip and the casing are soldered together. As can be recognized from the figure, the cross-section of this rope has much free space, which is well suited for the transmission and distribution of a cooling medium.

FIG. 8 shows the cross-section through yet another embodiment of the rope. The rope contains a relatively thick core-wire 61 made of normally conducting copper or aluminum, around which the three layers 62, 63, 64 or wire bundles are coaxially arranged. Each layer is stranded from many wire bundles, e.g. the wire bundles 65 or 66; 66 or 67. The layers are stranded with alternating direction of rotation, as indicated by the arrows 68, 69, 70. Many contact points thus arise, at which the individual wire bundles can be soldered together, whereby a relatively rigid cable structure is formed, which holds the wire bundles and the rope layers firmly in their predetermined positions.

Each of the coaxially arranged rope layers can be surrounded by a perforated thermally conducting material with high electrical resistivity. The spaces between the individual rope layers and between the wire bundles can be used as cooling channels for matrix cooling.

Figure 9:
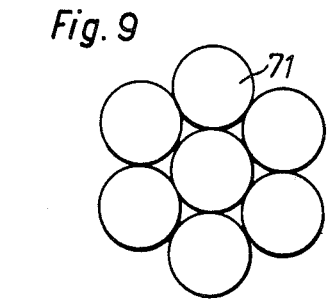
FIG. 9 is a schematic cross-sectional view through a cable, which contains many plaited ropes, each of which is composed of several wire bundles.

FIG. 9 shows schematically the cross-section through an embodiment of the cable, in which the ropes 71, each of which contain many wire bundles (not shown) are plaited together for an optimum tranposition, so that the location of the ropes in the cable cross-section is periodically changed. The ropes are soldered together in the region of the points or lines of contact.

Figure 10:
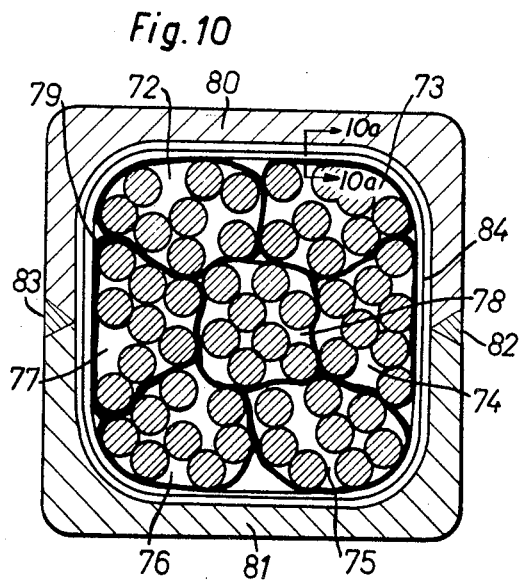
FIG. 10 is a cross-sectional view through a cable enclosed in a gas-tight casing, intended for forced cooling.
Figure 10A:
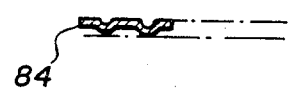
FIG. 10a is the longitudinal cross-sectional view, seen along the section 10a—10a in FIG. 10, of a heat insulator, which is inserted between the rope bundles and the casing of the cable corresponding to FIG. 10 only the heat insulator being shown for the sake of clarity.

FIG. 10 shows a cross-section through a cable which is enclosed in a casing. The cable contains many outer ropes 73 to 77, which are stranded around or plaited to the central rope 78. Each rope is composed of several wire bundles, which at the contact points or lines are soldered together and to a casing which encloses the rope, e.g. the casing 79. The casings of the ropes are soldered together in the region of the points or areas of contact. The ropes are placed into a cable casing, which is welded from two U-shaped shells 80, 81. These cable casings form the outer limits of the cooling channels for matrix cooling, and can, for example, when they are made from steel, absorb external forces and relieve the enclosed parts of the superconducting cable. On welding the two shells together such that the joint abutment is vacuum tight, a very high temperature arises in the region of the welding beads 82, 83. In order to protect the enclosed superconductors from this very high temperature, the ropes are preferably bandaged with a poor thermally conducting profiled steel strip 84. FIG. 10a shows the section through the steel strip along the line 10a—10a in FIG. 10.

Figure 11:
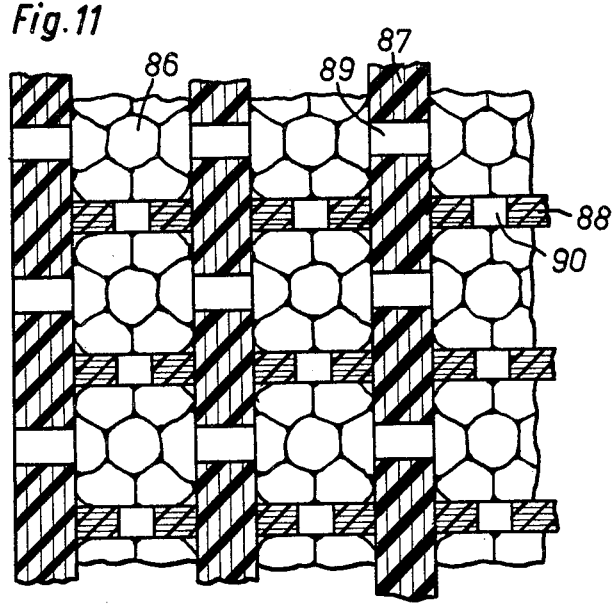
FIG. 11 is a partial cross-sectional view of a coil winding, intended to be immersed in a cooling bath.

FIG. 11 shows the section through a part of a coil wound with a superconducting cable, intended for bath cooling. The winding contains many superconducting cables 86, constructed corresponding to the cable shown in FIG. 9. The coil contains a coil former with coil insulation 87 and winding insulations 88, between which the cable windings are inserted. The coil and winding insulation separate the cable windings electrically from one another and form at the same time an effective mechanical framework for the whole coil.

The insulations are provided with large openings 89 and 90, which are to allow as far as possible the unrestricted flow of coolant through the coil.

Figure 12:
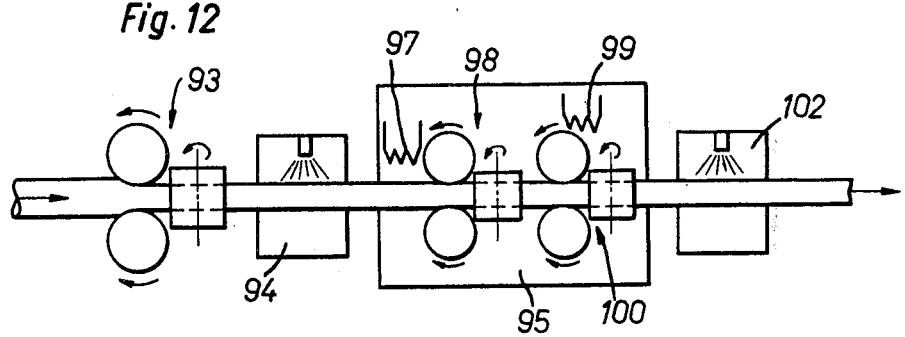
FIG. 12 is a schematic representation of an apparatus for manufacturing the new superconducting cable according to the invention.

An apparatus for the construction of the new cable is shown schematically in FIG. 12. The equipment has an inlet station 93 with two roll-pairs set at 90° to each other. The pressure of the roll-pairs directed along the cable axis causes a deformation and densification of the cable cross-section and especially the points and areas of contact, whereby the intended joining points or lines are enlarged by plastic flow. The cable then moves into a wetting station 94, in which it is impregnated with a flux, which facilitates the subsequent soldering. Afterwards the cable is fed through a soldering and calibrating station 95. A heating set-up 97 is arranged at the entrance to this station, which heats the whole cable electrically or inductively to a temperature which lies above the melting point of the solder. Two repressing roll-pairs 98 mounted perpendicular to each other are arranged in the feed direction of the cable after the heating set-up, in which the cable is again pressed together, whereby the liquid solder forms thin layers of solder at the contacting parts of the wire bundles and the ropes. A cooling set-up 99 and two pairs of sizing rolls 100 arranged perpendicular to each other form the exit from the soldering and calibrating station. As the cable goes through the sizing rolls, the cable cross-section is pressed together to the required final dimension and at the same time cooled to a temperature at which the solder solidifies. A washing station 102 is provided after the soldering and calibrating station. In this station the cable is sprayed with a cleansing agent which washes away any remains of the flux and other contaminants.

The equipment described makes possible the soldering of a prepared cable in a continuous process, and the soldered and cross-section calibrated cable is then ready to be enclosed in a casing or for bath cooling to be wound round a coil core.

Suitable solders for the process described are, for example, lead-tin or tin-silver solders.

It is to be understood that the materially connected joint can equally well be produced by welding or by a diffusion-bonding process.

On drawing the cable through the equipment described above and pressing the cable cross-section in the entry roll pair or repressing roll pair, the parts of the cable are plastically formed. Furthermore, on laying the cable in the casing, the parts of the cable are elastically pre-stressed. It is thus achieved that, under the action of the electromagnetic forces, the soldered cable parts can only be deformed elastically in the range of this pre-stress, and the deformation energy transformed into heat is minimized.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:
1. A super-conducting cable comprising:
a plurality of wires combined in groups to form plural wire bundles, said plural wire bundles combined in groups to form plural ropes, and said plural ropes being combined; and
a vacuum tight casing enclosing said plural combined ropes;
said wires in each of said bundles having plural mutual wire contact sites, said bundles in each of said ropes having plural mutual bundle contact sites, and said ropes enclosed in said casing having plural mutual rope contact sites;
wherein there is provided a substantially homogeneous metal-to-metal connection at said wire contact sites, said bundle contact sites and said rope contact sites, said wire bundles including a stabilizing material having contact sites connected to wires adjacent thereto by means of a substantially homogeneous metal-to-metal connection at the respective contact sites.

2. A cable according to claim 1, further comprising:
said stabilizing material including stabilizing sheets.

3. A cable according to claim 1, further comprising:
said stabilizing material including stabilizing wires.

4. A cable according to claim 1, further comprising:
said combined ropes including stabilizing sheets having contact sites connected to ropes adjacent thereto by means of a substantially homogeneous metal-to-metal connection at the respective contact sites.

5. A cable according to claim 1, further comprising:
said combined ropes including stabilizing wires having contact sites connected to ropes adjacent thereto by means of a substantially homogeneous metal-to-metal connection at the respective contact sites.

6. A cable according to claim 1, further comprising:
said wires at least partly surrounded by a non-magnetic thermally conducting material having high electrical resistivity in order to suppress eddy currents on the production of or application in alternating magnetic fields; and
said non-magnetic thermally conducting material surrounding any one wire connected at respective contact sites with the wire surrounded thereby and adjacent wires by means of a substantially homogeneous metal-to-metal connection at the respective contact sites.

7. A cable according to claim 1 or claim 6, further comprising:
said wire bundles at least partly surrounded by a non-magnetic thermally conducting material having high electrical resistivity in order to suppress eddy currents on the production of or application in alternating magnetic fields; and
said non-magnetic thermally conducting material surrounding any one wire bundle connected at respective contact sites with the wire bundles surrounded thereby and adjacent wires by means of a substantially homogeneous metal-to-metal connection at the respective contact sites.

8. A cable according to claim 1 or claim 6, further comprising:
said ropes at least partly surrounded by a non-magnetic thermally conducting material having high electrical resistivity in order to suppress eddy currents on the production of or application in alternating magnetic fields; and
said non-magnetic thermally conducting material surrounding any one rope connected at respective contact sites with the rope surrounded thereby and adjacent ropes by means of a substantially homogeneous metal-to-metal connection at the respective contact sites.

9. A cable according to claim 7, further comprising:
said ropes at least partly surrounded by a non-magnetic thermally conducting material having high electrical resistivity in order to suppress eddy currents on the production of or application in alternating magnetic fields; and
said non-magnetic thermally conducting material surrounding any one rope connected at respective contact sites with the wire surrounded thereby and adjacent ropes by means of a substantially homogeneous metal-to-metal connection at the respective contact sites.

10. A cable according to claim 4, further comprising:
the surrounding material surrounding said any one wire connected at respective contact sites with the surrounding material surrounding adjacent wires by means of a substantially homogeneous metal-to-metal connection at the respective contact sites.

11. A cable according to claim 5, further comprising:
the surrounding material surrounding said any one wire bundle connected at respective contact sites with the surrounding material surrounding adjacent wire bundles by means of a substantially homogeneous metal-to-metal connection at the respective contact sites.

12. A cable according to claim 6, further comprising:
the surrounding material surrounding said any one rope connected at respective contact sites to the surrounding material surrounding adjacent ropes by means of a substantially homogeneous metal-to-metal connection at the respective contact sites.

13. A cable according to claims 1, 2, 3, 4, 5, 6, 10, 11 or 12, comprising:
solder joints for making said substantially homogeneous metal-to-metal connections at said contact sites.

14. A cable according to claim 7, comprising:
solder joints for making said substantially homogeneous metal-to-metal connections at said contact sites.

15. A cable according to claim 9, comprising:
solder joints for making said substantially homogeneous metal-to-metal connections at said contact sites.

16. A cable according to claim 1, further comprising:
said wire bundles arranged lattice-like in several adjacent layers formed on top of each other with the wire bundles of each layer aligned parallel to each other within each layer; and
the wire bundles of adjacent layers occluding an angle having a bisector which lies along the longitudinal direction of the cable.

17. A cable according to claim 8, comprising:
solder joints for making said substantially homogeneous metal-to-metal connections at said contact sites.

* * * * *